UNITED STATES PATENT OFFICE.

FREDERICK M. EKERT, OF AKRON, OHIO, ASSIGNOR TO THE U. S. EKERT FIBRE COMPANY, OF CLEVELAND, OHIO, A CORPORATION OF OHIO.

PROCESS OF PRODUCING COMPOUNDS CONTAINING RUBBER AND FIBER.

No. 870,349.  Specification of Letters Patent.  Patented Nov. 5, 1907.

Application filed March 20, 1907. Serial No. 363,472.

*To all whom it may concern:*

Be it known that I, FREDERICK M. EKERT, residing at Akron, in the county of Summit and State of Ohio, have invented a certain new and useful Improvement in Processes of Producing Compounds Containing Rubber and Fiber, of which the following is a full, clear, and exact description, reference being had to the accompanying drawings.

This invention relates to a process for producing bodies containing rubber or similar gum-like material and fiber (either alone or in conjunction with other ingredients) and has for its object to so commingle and combine together the rubber or other gum-like material and the fiber, as well as additional materials which may be deemed necessary to incorporate therewith, as to enable a large amount of fiber to be incorporated with such rubber or gum-like material without destroying the fibrous condition of the fiber and without sacrificing the combining qualities and resilience of the rubber.

The invention is in the nature of an addition to or improvement upon the process disclosed in my Patent No. 836,068 issued November 13, 1906:

In carrying out my process, the washed rubber is first broken down in a mill which is preferably separate from the mill in which the mixing of the rubber with other ingredients is done. This enables the rubber to be quickly broken down without heating the even-motion rolls by which the mixing of the rubber and fiber is to be accomplished. Furthermore, the sulfur that is used for vulcanization is mixed with the rubber before the addition of the fiber and other ingredients. The mill in which this breaking down is accomplished is one having ordinary differential rolls by means of which the rubber is quickly reduced to a somewhat dry, coherent, semi-plastic mass, and the sulfur necessary for vulcanization is mixed with the rubber in the same machine. The use of the differential rolls in a separate machine enables the rubber to be quickly broken down and the sulfur to be mingled therewith without heating the even motion rolls by means of which the fiber and other ingredients are to be added to the rubber.

It is very important that the sulfur should be mingled with the rubber before addition of the fiber; for if the sulfur were added with the fiber, friction and heat would be developed such as would partially or entirely vulcanize the rubber and prevent the further incorporation of fiber therewith.

To enable the mixing of the fiber in large quantities with the rubber and sulfur, it is necessary to preserve the plasticity of the rubber in order that the fiber may be squeezed thereinto without the development of friction, which will produce heat and destroy the characteristic qualities of the rubber and render the compound of rubber and fiber worthless. For this purpose, the resin is incorporated with the rubber after the addition of the sulfur and before the addition of the fiber. This incorporation of the resin with the rubber and sulfur may be done on the same mixing mill, having differential rolls, on which the rubber is broken down. The rubber thus treated with sulfur and resin is rolled into a sheet and brought to a table where a good handful of fiber is applied to the middle of the sheet. The sheet is then folded and passed between even-motion rolls. The action of these rolls is to mix the fiber in a frictionless manner with the rubber. In sticky rubber, such as South African rubbers, the sheet thus rolled will adhere to one of the rolls and must be separated therefrom to prevent forming a mantle with the roll. With less sticky rubber, the sheet will not adhere to the roll and will drop into the pan as a sheet. It is necessary that the folded sheet which has been passed through the rolls should not be allowed to adhere to either of the rolls, as this will produce only surface-incorporation of fiber, and the compound which adheres to the roll would become so stiff, if anything, like the necessary amount of fiber be added, as to prevent further incorporation of fiber, and any attempt to force fiber into the stiffened sheet will result in crumbling the latter to a worthless mass or break the necks of the rolls. The building of a mantle around one of the rolls, as occurs in all ordinary rubber mixing, should be avoided. This is accomplished by continuously folding the sheet which is formed by pressing the rubber and fiber between the rolls. That is to say, the sheet will be removed from between the rolls before the formation of a mantle. The use of any ordinary rubber mill in which differential rolls are employed should also be avoided in incorporating the fiber with the rubber. It is absolutely necessary that the rolls should run at substantially even speed.

To the new sheet which has been formed by passing the folded rubber and fiber through the even motion rolls, another handful of fiber will be added, the sheet folded and again passed through the rolls. This operation will be repeated until all the fiber which is necessary is incorporated. To maintain the plasticity of the rubber while mixing the fiber therewith and thus permit the frictionless incorporation of the fiber with the rubber, emollients such as set forth in my Patent No. 836,068 will be continuously added. This assists in squeezing the fiber into the rubber without any possible development of friction and heat, which must be avoided in order to preserve the characteristic qualities of the rubber and the fibrous condition of the fiber, and to prevent the sulfur from acting upon the rubber, and furthermore to prevent stiffening, hardening, and deteriorating of the whole compound.

It is further necessary that the even-motion rolls on which the mixing is done should be kept cool during the operation of mixing. This is rendered possible by first employing a separate machine for breaking down the rubber and mixing the sulfur and resin therewith, and by cooling the rolls of the even-motion mill by the use of water circulating therethrough during the operation of mixing the rubber and fiber in the latter. The rolls should be cooled when the mixing is started and should be kept cool during the entire mixing operation, which condition need not be particularly observed or employed as a rule in ordinary compound work, wherein, on the contrary, the mixing for ordinary work is done with heated rolls, in order to keep the compound hot and to allow the mixing to be accomplished in the shortest possible time. Furthermore, the sheet of rubber should preferably be folded always in the same direction and passed through the rolls in the same direction to avoid unnecessary breaking of parts of the fiber and the partial heating of the compound by the extra friction thus developed.

After all the fiber has been incorporated which is necessary for the particular purpose for which the goods are intended, the rubber-fiber sheet is more or less porous. For the purpose of correcting this defect, powdered materials which are best qualified for the purpose for which the compound is intended are added, preferably after the fiber has been incorporated. These materials are added in the same way as the fiber, taking care to fold the sheet and pass the same through the rolls preferably in the same direction, adding emollients as necessary to preserve the plasticity of the sheet and permit the mixing to be done without development of friction and consequent heat.

While articles containing rubber and fiber may be produced by squeezing the fiber into the surfaces of the rubber by simply throwing or sprinkling the fiber upon the sheet and passing the same in this condition through the rolls without any folding, the goods produced by the continuous folding operation are by far the best, while the compounds produced thereby remain in a more or less plastic state, thus permitting the same to be handled continuously and mixed over again if desired with no loss by reason of scraps, because the somewhat plastic condition of compounds produced by the folding operation allow the mixing therewith of scraps. Furthermore, the old scraps from compounds produced by continuous folding may be mixed together by prior careful warming thereof.

The ceasing of the folding operation or the failure to fold from the start causes the sheet to become stiff and to refuse subsequent folding and the taking up or incorporating therewith of fiber or other ingredients. Furthermore, any attempt to forcibly incorporate the fiber or other materials into the stiffened sheet would result either in crumbling the whole mass to pieces or the breaking of the gears whereby the rolls are driven or the necks of the rolls themselves. By the employment of the continuous folding operation, any desired proportion of fiber or other or additional materials may be incorporated with the rubber without the production of any material friction and without the tearing of the fiber or the production of heat such as would be likely to destroy the fiber, impair the fibrous condition thereof, or destroy the rubber or the entire compound. Furthermore, by the employment of this folding operation and the use of large amounts of the emollients the compounds can be made so plastic as to enable them even to be run through a tubing machine for the manufacture of any kind of hose and other tubing; also for the production of numerous other articles, such as tires, etc.

The particular fiber which will be incorporated with the rubber will depend upon the purposes for which the body thus formed is intended. For valve disks or packings, for steam hose, insulation for electric currents, and for various other purposes in the arts where the product is to be exposed to high pressures or temperatures, or both, inorganic fiber such as asbestos will be preferably employed. For ordinary tubing, water hose, bicycle tires, etc., other fibrous material may be employed, for instance, organic fiber, such as cotton, hemp, etc. For automobile tires, either asbestos or asbestos mingled with organic fiber, such as cotton, etc., will be employed, and my process contemplates the mingling of any kind of fiber with rubber, rubber compounds, or other similar materials for the production of bodies wherein the preservation of the fibrous condition of the fiber and the coherence of the rubber is material and where great tensile strength and tenacity are important considerations.

As previously intimated, it will be desirable to incorporate with the fiber, for the production of most compounds, pore-filling material. This material may be any or all of the pore-filling materials specifically enumerated in my Patent No. 802,327, or other material, more or less suitable, either alone or in addition to the pore fillers of said patent, such as silica, silicates, alumina, aluminates, and the oxids, sulfates, sulfids, and carbonates of lead, barium, calcium and magnesia, as well as oxids and sulfids of antimony, and similar materials or combinations or mixtures of the same. The pore-fillers herein set forth may be employed to advantage where high steam-resisting qualities are not desirable or necessary, but where tensile strength and tenacity of body are mainly desired, as in the case of water tubing, hose, tires, etc., such strength being perfectly secured by the employment, practically intact, of the fiber incorporated in accordance with my process.

The pore-filling materials will be incorporated in the same manner as the fiber, and preferably after all or the main part of the fiber has been incorporated with the rubber. That is to say, the mass of fiber and rubber will be rolled into a sheet, the pore-filling material added and the sheet then folded over and passed again between the rolls, in the same manner as explained in connection with the incorporation of the fiber, repeating the operation until the requisite amount of pore-filling material has been incorporated.

By the operation of continuously folding the rubber and fiber (and other ingredients) and passing the folded sheet through the rolls, I am enabled to thoroughly intermingle the rubber with the fiber and other materials in any desired proportions and with a minimum of friction. At the same time, this thorough intermingling can be accomplished in a machine having but one set of even motion rolls therein, obviating the necessity for expensive machinery.

Wherever, in this specification and in the claims, I have employed the term "rubber", it will be understood that this term comprises other gum-like materials, such as balata, gutta-percha, chicle, akra, ponstood that this term comprises other gum-like materials, such as balata, gutta-percha, chicle, akra, pontianak, etc., or the articles known to the trade as "reclaimed rubber", "rubber shoddy", or unvulcanized "compounded rubber", etc., either alone or in admixture with each other, or with rubber, as the materials mentioned have more or less binding and more or less elastic or other physical qualities resembling rubber. Furthermore, my process is applicable not only to incorporating fiber with rubber alone, but also, in limited quantities, with a compound or mixture of rubber with other materials, as the addition of fiber to such compound or mixture will greatly improve the tensile strength and tenacity thereof. Hence I do not propose to be limited to the incorporation of fiber with pure rubber or similar gum-like material alone.

As in the case of my Patents Nos. 802,327 and 836,068, the ingredients should be mingled in a dry condition, as this not only produces better materials, but obviates the tedious and expensive steps of evaporating and drying prior to vulcanization. In producing goods other than steam-resisting goods, electric insulators, hose, tubing, etc., the emollients may be used in larger proportions, corresponding to the higher degree of plasticity which is necessary for the practical manufacture of the different classes of goods. The same is true as to the porportions of all other ingredients,—fiber, resin, sulfur, and pore-fillers,—the quality and quantity of which depend upon and naturally vary with the articles to be produced and the purposes for which the same shall be employed.

I claim:

1. The process of producing compounds of rubber or similar gum-like material and fiber which consists in forming said rubber or material into a sheet, adding the fiber to the sheet, folding the sheet, passing the folded sheet between substantially even-motioned rolls, continuously repeating the operations of adding fiber and folding until the requisite amount of fiber has been incorporated with the rubber or similar material, the folding of the sheet being made generally in the same direction to prevent the breaking of the fiber, meanwhile maintaining the sheet in a plastic condition to enable the fiber to be pressed thereinto substantially without friction.

2. The process of producing compounds of rubber or similar gum-like material and fiber which consists in forming said rubber or material into a sheet, adding the fiber to the sheet, folding the sheet, passing the folded sheet between substantially even-motion rolls, adding fiber to the sheet thus formed, folding the sheet in the same direction as before and passing the sheet in the same direction as before through the even-motion rolls, repeating the above operations until the requisite amount of fiber has been incorporated with the rubber or similar material.

3. The process of producing compounds of rubber or similar gum-like material and fiber which consists in forming said rubber or material into a sheet, adding the fiber to the sheet, folding the sheet, passing the folded sheet between substantially even-motion rolls, adding fiber to the sheet thus formed and again folding the sheet in the same direction as before and passing the folded sheet through the even-motion rolls in substantially the same direction as before, repeating the above operations, with the addition of emollients to preserve the plasticity of the rubber, until the requisite amount of fiber has been incorporated.

4. The process of producing compounds of rubber or similar gum-like material with fiber and another ingredient which consists in forming said rubber or material into a sheet, adding to the sheet one of the aforesaid ingredients, folding the sheet thus treated, passing the folded sheet between substantially even-motion rolls, repeating the operations of adding the ingredient, folding and rolling until the desired amount of said ingredient has been incorporated, then adding to the sheet of rubber and said ingredient the second ingredient, folding the sheet, passing the folded sheet between the rolls, repeating the operations of adding the second ingredient, folding and rolling until the desired amount of the latter ingredient has been incorporated, and maintaining the plasticity of the rubber to permit the frictionless incorporation of the ingredients therewith.

5. The process of producing compounds of rubber or similar gum-like material with fiber and another ingredient, which consists in forming said rubber or material into a sheet, adding to the sheet one of the aforesaid ingredients, folding the sheet thus treated, subjecting the folded sheet to frictionless pressure, repeating the operations of adding the ingredient, folding and subjecting to frictionless pressure until the desired amount of said ingredient has been incorporated, then adding to the sheet of rubber and said ingredient the second ingredient, folding the sheet, subjecting the folded sheet to frictionless pressure, repeating the operations of adding the second ingredient, folding and subjecting to frictionless pressure until the desired amount of the latter ingredient has been incorporated, the folding of the fiber-containing sheet being made in the same direction to prevent friction and the breaking of the fiber, substantially as specified.

6. The process of producing compounds of rubber or similar gum-like material and fiber which consists in forming said rubber or material into a sheet, adding the fiber to the sheet, folding the sheet, passing the same between substantially even-motion rolls to form a new sheet, quickly removing the sheet thus formed, adding fiber to said sheet, and repeating the operations of folding, passing between the rolls, and quick removal therefrom until the requisite amount of fiber has been incorporated, meanwhile maintaining the rubber in a plastic condition to permit the frictionless incorporation of the fiber therewith, substantially as specified.

In testimony whereof, I hereunto affix my signature in the presence of two witnesses.

FREDERICK M. EKERT.

Witnesses:
  FRANCIS SEIBERLING,
  MAE BROWN.